United States Patent [19]

Katsuta

[11] Patent Number: 4,999,629
[45] Date of Patent: Mar. 12, 1991

[54] TWO TONE AND MULTIPLE IMAGE DISCRIMINATION AND SIGNAL BINARIZATION SYSTEM

[75] Inventor: Yuji Katsuta, Yamatokoriyama, Japan

[73] Assignee: Sharp Kabushiki Kaisha, Osaka, Japan

[21] Appl. No.: 212,672

[22] Filed: Jun. 28, 1988

[30] Foreign Application Priority Data

Jun. 30, 1987 [JP] Japan ................... 62-164465

[51] Int. Cl.$^5$ .................... H03M 1/12; H04N 1/40
[52] U.S. Cl. .................... 341/155; 341/126; 358/455; 358/462; 382/52
[58] Field of Search .......... 358/256, 261.4, 262.1, 358/280, 283, 284, 455, 462, 450, 456, 457, 463, 464, 465, 466, 467; 381/50, 51, 52; 341/155, 126

[56] References Cited

U.S. PATENT DOCUMENTS

| 4,251,837 | 2/1981 | Janeway, III | 382/50 |
| 4,729,035 | 3/1988 | Tanioka | 358/455 |
| 4,831,658 | 5/1989 | Umeda | 382/52 |
| 4,853,792 | 8/1989 | Katsuta et al. | 358/455 |
| 4,893,188 | 1/1990 | Murikami et al. | 358/464 |
| 4,903,316 | 2/1990 | Hongo et al. | 358/464 |

FOREIGN PATENT DOCUMENTS

| 54-38727 | 3/1979 | Japan | 382/50 |
| 59-02483 | 9/1984 | Japan | 358/462 |

Primary Examiner—William M. Shoop, Jr.
Assistant Examiner—H. L. Williams

[57] ABSTRACT

An image signal binarization system for documents containing a mixture of two level and multiple level tone areas, such as characters and photographs, would provide an improved output if the system could distinguish between the two areas and respond accordingly. The proposed system distinguishes between the two types of areas by examining the density of a target point in relation to the average density of the surrounding points. If the density of the target point falls within a predetermined range the area is determined to be a multi-tone section otherwise the area is determined to be a two-tone section. The binarization system upon determining a given section to be a two tone section forces the output to one or zero. For a multi-tone section the output is based upon the mean density.

6 Claims, 1 Drawing Sheet

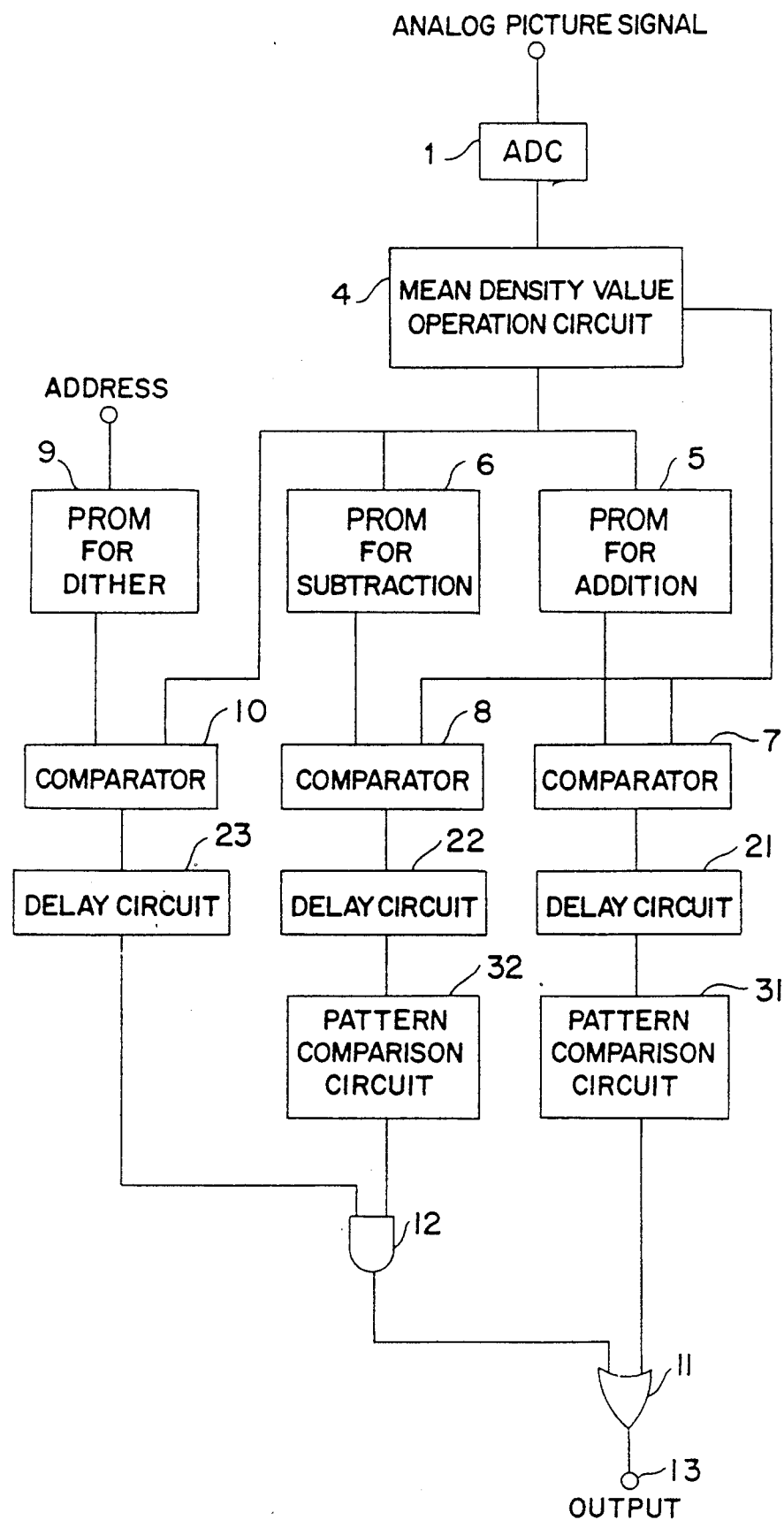

TWO TONE AND MULTIPLE IMAGE DISCRIMINATION AND SIGNAL BINARIZATION SYSTEM

BACKGROUND OF THE INVENTION

This invention relates to a picture signal binarization system for binarizing analog picture signals.

Conventionally, a multiple-tone image such as a photograph is converted to picture signals by a dither method, while a two-tone image, such as a character is converted to picture signals of two gray levels.

The actual image on a document may be, however, the mixture of an image portion, which should be converted to picture signal of multiple gray levels as a photograph is, and an image portion which should be converted to picture signals of two gray levels, as a character is. If such an image is processed by the dither method, a character portion may be illegible. Further, if it is converted to picture signals of two gray levels, a multiple-tone image portion cannot be reproduced.

SUMMARY OF THE INVENTION

Accordingly, an object of the present invention is to provide a picture signal binarization system capable of converting both a multiple-tone portion and a two-tone portion of an image into picture signals of accurate gray levels.

Briefly described, in accordance with the present invention, a picture signal binarization system includes an operation device for computing the mean density value of the points in a predetermined range around a target point to be binarized of an image. It also includes a first determination device for determining whether or not the density of the target point is higher than a first value obtained by adding a specified value to the mean density value, and a second determination device for determining whether or not the density of the target point is lower than a second value obtained by subtracting another specified value from the mean density value. A binarization device is includes for binarizing the mean density value as is a third determination device for generating a binary data for the target point on the basis of the output from the first determination device and the binary-coded density information for the region around the target point. A fourth determination device is included for generating a binary data for the target point on the basis of the output from the second determination device and the binary-coded density information for the region around the target point. An AND gate for AND operation between the output from the mean value binarization device and the output from the fourth determination device. Finally, an OR gate is included for an OR operation between the output from the third determination device and the output from the AND gate.

BRIEF DESCRIPTION OF THE DRAWINGS

The present invention will become more fully understood from the detailed description given hereinbelow and the accompanying drawing which is given by way of illustration only, and thus are not limitative of the present invention and wherein:

The figure is a block diagram showing the basic configuration of an embodiment of the present invention.

DESCRIPTION OF THE PREFERRED EMBODIMENT

In the picture signal binarization system according to the present invention, operation means computes the mean density value of the points in a specified range around a target point to be binarized of an image, and a first determination device judges whether or not the density of the target point to be binarized is higher than a first value calculated by adding a specified value "A" to the mean density value. Further, a third determination device outputs binary data for the target point generated from the output of the first determination device and the binary-coded density information of the points in the vicinity of the target point.

Meanwhile, a second determination device judges whether or not the density of the target point to be binarized is lower than a second value calculated by subtracting another specified value "B" from the mean density value output from the operation device. A fourth determination device outputs a binary data for the target point to be binarized generated from the output of the second determination device and the binary-coded density information of the points in the vicinity of the target point.

The mean density value is binarized by a mean value binarization device. An AND gate operates to compute and AND operation between the output of the mean value binarization device and the output of the fourth determination device. An OR gate operates to compute an OR operation between the output of the AND gate and the output of the third determination device, thus binarizing the picture signal of the target point.

The picture signal binarization system of an embodiment of the present invention is described in the following with reference to the accompanying drawing.

An A/D converter 1 converts the analog picture signals in a specified range of an image to eight-bit digital data. The value of the digital data thus converted is larger in proportion to the density of the image being higher.

A mean density value operation circuit 4 computes the mean density value of the specified 8×8 points on the image from the digital data for the 8×8 points. Receiving the mean density value output as an address data from the mean density value operation circuit 4, a PROM, for addition 5, outputs the sum of the mean density value and a specified value "A" determined by the mean density value. Receiving the mean density value output as an address data from the mean density value operation circuit 4, a PROM, for subtraction 6, outputs a value which is smaller than the mean density value by a specified value "B" determined by the mean density value.

A comparator 7 compares the data output from the PROM for addition 5 with the reference data located virtually in the center of the digital data for the 8×8 points output from the mean density value operation circuit 4. The comparator 7 outputs "0" when the reference data output from the mean density value operation circuit 4 is smaller than the data output from the PROM for addition 5, and outputs "1" when the former is larger than the latter. A comparator 8 compares the data output from the PROM for subtraction 6 with the reference data output from the mean density value operation circuit 4. The comparator 8 outputs "0" when the reference data from the mean density value operation circuit 4 is smaller than the data output from the PROM for subtraction 6, and outputs "1" when the former is larger than the latter.

A PROM for dither 9 uses two bits of an address data given, for selecting the dither type, and the remaining six bits for selecting one of the 8×8 dither patterns. A comparator 10 compares the data output from the PROM for dither 9 with the mean density value output from the mean density value operation circuit 4, and outputs the mean density data binarized by the dither method.

A delay circuit 21 delays the data output from the comparator 7 and outputs data corresponding to the 3×3 points with the target point to be binarized as the center. When the central data of the 3×3 data output from the delay circuit 21 is "1" and at least one of the eight data for the surrounding eight points is "1", a pattern comparison circuit 31 outputs "1".

A delay circuit 22 delays the data output from the comparator 8 and outputs data corresponding to the 3×3 points with the target point to be binarized as the center. When the central data of the 3×3 data output from the delay circuit 22 is "0", and at least one of the eight data for the surrounding eight points is "0", a pattern comparison circuit 32 outputs "0". A delay circuit 23 delays the output from the comparator 10, and outputs data corresponding to the point to be binarized.

The output of the pattern comparison circuit 31 is input to an OR circuit 11. The output of the pattern comparison circuit 32 and the output of the delay circuit 23 are input to an AND circuit 12. The output of the AND circuit 12 is input to the OR circuit 11, and the output of the OR circuit 11 is input to terminal 13 of the picture signal binarization system.

When the density value of the target point to be binarized is larger than the sum of the mean density value of the surrounding points and the specified value "A", the comparator 7 outputs "1". If output data for any one of the surrounding eight points is also "1", the pattern comparison circuit 31 outputs "1" and consequently the output to the terminal 13 is "1". In contrast, when the density value of the target point is smaller than a value obtained by subtracting the specified value "B" from the mean density value of the surrounding points, the comparators 7 and 8 output "0" and the pattern comparison circuit 31 outputs "0". If output data for any one of the surrounding eight points is also "0", the pattern comparison circuit 32 outputs "0" and consequently "0" is output to the terminal 13. Therefore, for a two-tone image such as characters in which the density of a particular point to be binarized differs largely from the mean density of the surrounding points, either "1" or "0" is forcedly output to the terminal 13.

When "1" or "0" is forcedly output, the pattern comparison circuits 31 and 32 use the dither method to reproduce a noise-free binary image.

If the density value of the target point to be binarized is smaller than the sum of the mean density value of the surrounding points and the specified value "A" but larger than the value obtained by subtracting the specified value "B" from the mean density value of the surrounding points, the comparator 7 outputs "0" and the comparator 8 outputs "1". Then the mean density value output from the comparator 10 is binarized by the dither method and output through the delay circuit 23, the AND circuit 12 and the OR circuit 11 to the terminal 13. In other words, for a multi-tone image such as a photograph, in which the density value of a particular point to be binarized is close to the mean density value of the surrounding points, a binary data depending upon the mean density value is output to the terminal 13.

In the above embodiment of the invention, the pattern comparison circuits 31 and 32 are designed to eliminate noise from one point. The construction of the circuits 31 and 32 may be changed to reproduce a noise-free image by replacing the pattern according to the image.

Further, this embodiment is based on comparison of 3×3 digital data patterns. Alternatively, larger patterns may be used for comparison, which permits more effective noise elimination. According to the present invention, as described above, when the density of a particular point to be binarized is substantially different from the mean density of the surrounding points, binary data of "1" or "0" is output forcedly for the particular point according to the comparison result of which density is larger. When the density of a particular point to be binarized is close to the mean density of the surrounding points, a binary data according to the mean density value is output. Therefore, even if an image to be reproduced is a mixture of the two-tone image such as characters and the multi-tone image such as photographs, both two-tone image and multi-tone image can be binarized accurately. Since mean density value is used in processing by the dither method, even a mesh image does not cause a moire pattern.

Moreover, even if an original image contains a large amount of noise, the system eliminates noise from one point by one point, and uses the mean value of the 8×8 digital data for the dither method, thereby reproducing a noise-free image.

In the above description of the present invention, the specified value "A" may be the same as, or different from, the specified value "B".

While only certain embodiments of the present invention have been described, it will be apparent to those skilled in the art that various changes and modifications may be made therein without departing from the spirit and scope of the present invention as claimed.

What is claimed is:

1. A picture signal binarization system for converting both multiple-tone portions and two-tone portions of an image into picture signals of accurate graylevels comprising:
   operation means for computing the mean density value of points in a predetermined range around a particular point of an image to be binarized;
   first determination means operatively connected to said operation means for determining whether or not the density value of the particular point is larger than a first value, said first determination means including first comparator means for comparing an output of the first determination means with an output from the operation means;
   second determination means operatively connected to said operation means for determining whether or not the density value of the particular point is smaller than a second, said second determination means including a second comparator means for comparing an output from the second determination means with an output from the operation means;
   a first delay circuit operatively connected to said first comparator for delaying the output of said first comparator;

a first pattern comparison circuit operatively connected to said first delay circuit;

a second delay circuit operatively connected to said second comparator for delaying the output of said second comparator;

a second pattern comparison circuit operatively connected to said second delay circuit;

a third comparator operatively connected to said operation means for comparing the mean density value from the operation means with another value; and a third delay circuit operatively connected to said third comparator.

2. The picture signal binarization system of claim 1, further comprising:

an AND gate operatively connected to an output of said second pattern comparison circuit and an output of said third delay circuit and;

an OR gate operatively connected to an output of said first comparison circuit and an output of the AND gate.

3. The picture signal binarization system of claim 2, wherein the output of said OR gate is operatively connected to an output terminal of the picture signal binarization system.

4. The picture signal system of claim 3, wherein an A/D converter is operatively connected to said operation means.

5. The picture signal binarization system of claim 1, wherein the first value is the sum of the mean density value and a specified value, the second value bearing the difference between the mean density value and another specified value.

6. The picture signal system of claim 1, wherein an A/D converter is operatively connected to said operation means.

* * * * *